United States Patent Office 3,679,504
Patented July 25, 1972

3,679,504
METHOD OF FORMING COLOR EFFECTS
IN HYDROGEL CONTACT LENSES AND
OPHTHALMIC PROSTHESES
Otto Wichterle, Prague, Czechoslovakia, assignor to
Ceskoslovenska akademie ved, Prague, Czechoslovakia
No Drawing. Filed Mar. 26, 1969, Ser. No. 810,843
Claims priority, application Czechoslovakia,
Apr. 5, 1968, 2,571
Int. Cl. B32b 31/00
U.S. Cl. 156—62
11 Claims

ABSTRACT OF THE DISCLOSURE

Object of the invention is a method of forming color effects in hydrogel contact lenses and ophthalmic prostheses, wherein the colored pattern is formed between at least two transparent hydrogel layers, bound together by polymerizing between them a monomer mixture forming the same or similar hydrogel. A homogeneous transparent thin covering layer of hydrogel is first formed on a regular surface of a smooth pad. The desired colored pattern is then formed between it and the concave surface of a lens or that of an ophthalmic prosthesis, being either laid between them as a thin foil or created on either the said concave surface or said covering layer, the last mentioned embodiment being preferred. The bond between the lens or prosthesis and the covering layer is realized by putting a drop of initiated monomer mixture between them and pressing them slightly together so that the excess of the monomer mixture is expressed. The colored pattern is preferably formed using colors, dyestuffs or pigments which are insoluble in water and in monomer mixture. The finished lens or prosthesis is then removed from the pad by swelling the whole in a swelling liquid such as water or alcohol and kept in sterile physiologic solution.

REFERENCE TO COPENDING APPLICATIONS

In French Pat. No. 1,499,774 (U.S. patent application No. 673,026, which is a continuation-in-part application to the application No. 593,643, filed Nov. 14, 1966 now abandoned), there is disclosed a method for manufacturing colored hydrogel contact lenses and ophthalimc prostheses, wherein a mixture of ethylene glycol monomethacrylate with a little ethyleneglycol dimethacrylate is polymerized in a mold rotating about an axis perpendicular to a spherically concave mold face to form a shape-retaining hydrophilic polymer layer. A very thin layer of opaque matter is deposited on the exposed polymer face and covered with a second layer of the monomer mixture, which is then polymerized under rotation to form, together with the above mentioned layers, the finished contact lens or front part of the eye prosthesis. The opaque material may simulate the iris, pupil, and/or sclera of an eye when the laminer product is ultimately swelled by contact with physiological saline solution prior to use as a soft contact lens or as a part of an artificial eye.

BACKGROUND OF THE INVENTION

This invention relates to improvements in soft contact lenses and articfical eyes made from hydrogels consisting essentially of water-swollen sparingly cross-linked hydrophilic polymers, and particularly to partly opaque ophthalmic device such as contact lenses and eye-prostheses.

The materials for the ophthalmic devices with which this invention is particularly concerned have been disclosed inu Pats. Nos. 2,976,576 and 3,220,960. A typical representative of the hydrophilic polymers suitable for the use in making the ophthalmic devices is a copolymer of ethyleneglycol monomethacrylate with less than 2% of ethyleneglycol dimethacrylate. The hydrogels of the polymer are distinguished by their excellent transparency and lack of color.

The above mentioned method, using a two-stage polymerization casting in a rotating mold, has certain disadvantage in that the colored pattern, if created by hand, must be made from behind, the actual appearance thereof being visible only after removing the swollen article from the mold. Morevover, the pattern is to drawn on a concave surface and on a water-swollen hydrogel so that the pattern is sometimes blurred by diffusion of the ink. Although said disadvantages may be overcome by the skill of the worker, they nevertheless and tend to delay the work and increase the amount of waste.

It has been found that a very thin plan-parallel layer added to the concave surface of a ready made contact lens does not impair the quality of the lens in any way. Thus, the method of the invention consists in forming first a thin covering layer of the hydrophilic polymer on a regular surface of a smooth pad, e.g. on a polished glass plate. Such plan-parallel very thin layer may be easily mead by putting a drop of the initiated monomer mixture onto the pad and covering it with a smooth covering plate, e.g. a thin glass plate such as used for covering specimen for microscopical examination. Air bubbles are to be avoided. As soon as the access of the oxygen is excluded, the polymerization takes place rapidly. The covering plate is removed, if necessary after swelling the polymer in water or alcohol. The polymer layer dries rapidly when exposed to the atmosphere. Now, the colored pattern can be drawn in front view onto a planar surface so that the drawing and/or dyeing is very convenient and reliable. The pattern or a part of it may be also printed using a stamp or other printing die or stencil. Alternatively, a ready made pattern on a thin foil, e.g. a color film copy, may be laid onto the first polymer layer. Thereafter another drop of the initiated monomer mixture is put onto the pattern and covering layer, and a finished hydrogel contact lens or the front part of the artificial eye is pressed slightly thereon until the whole is firmly bound by the polymerized monomer mixture which has partly penetrated into the two hydrogel layers. The procedure is made easier if the hydrogel lens or the front part of the artificial eye is first planarized under at least partial dehydration, the lens or similar being pressed onto a smooth glass or metal surface heated above about 100° C. The dehydrated polymer becomes soft and plastic at about 120° C., but any amount of water contained therein decreases the softening temperature. The lens and the pad are then cooled down under the softening temperature so that the lens, after having been removed from the pad, is now planarized. It can be easily bonded to the covering layer with the colored pattern by a single drop of initiated monomer mixture. Finally, the whole is swelled, advantageously in water or in a physiologic solution, whereby the lens or the front part of the artificial eye returns to its original shape. The change of curvature caused by the thin covering layer and pattern is in most cases negligible. If necessary, the original lens may be a little more curved so that the change shifts the curvature to the desired optimum.

SUMMARY OF THE INVENTION

The invention resides in a new method for manufacturing colored soft hydrogel contact lenses or ophthalmic prostheses, having the colored pattern enclosed between at least two layers of soft, transparent hydrogel so that the dyestuff or pigment cannot get in contact with the eye or the eye-lid. The method makes possible to use hydrogel contact lenses or the front parts of artificial eyes in finished state, without respect to the method by which they have been made. Thus, the method according to the invention does not necessitate any change in the usual manufacture of the lenses or front parts of artificial eyes. It is also possible to use contact lenses which have been turned from hard, non-swollen polymer blocks or blanks in the well known manner.

The new method consists in making first a thin transparent hydrophilic polymer layer of uniform thickness on a smooth pad, which may be either planar or spherical. On said layer, either wet or dried, a colored pattern is made, then a contact lens or a front part of the artificial eye is bonded thereon with its concave side by means of an initiated monomer mixture forming the same or similar hydrophilic polymer. Advantageously, all layers do not substantially differ in their swelling degree in order to avoid deformations. If the pad, on which the thin covering layer is first made, is spherical, said layer may be swollen with water, and the contact lens or similar cemented thereto may be also in swollen condition. Only the monomer cement is preferably free of appreciable amounts of water or other swelling agent. If, however, the pad is planar, the covering layer is preferably in non-swollen condition and the lens or the front part of the artificial eye cemented thereon is planarized also in substantially dry state.

The covering hydrogel layer may be also made by means of a solution of a non-crosslinked hydrophilic polymer such as glycol monomethacrylate polymer, containing in some cases glycol dimethacrylate units up to some degree. Such soluble polymers, containing polymrizable side groups, can be manufactured by polymerizing the monoester containing up to about 30% of the diester in an appropriate solvent, having the interaction parameter with respect to the polymer lower than 0.5 as disclosed in the U.S. patent application No. 639,021, filed on May 17, 1967, Method of Preparing Soluble Polymers of Ethylene Glycol, or in French patent specification No. 1,523,779. A thin layer of the solution of said non-crosslinked polymer is applied onto the pad and the solvent left to evaporate. The monomer cement containing the cross-linking glycol dimethacrylate, penetrates into the soluble covering layer, copolymerizes therewith by means of the pendent vinyl side-groups of the soluble polymer so that said covering layer becomes insoluble and bound with the lens to a single giant macromolecule. The bond is better when the lens and the covering layer are substantially dry, water being a rather bad swelling agent for glycol methacrylate polymer.

The layer of the cement is absolutely negligible since any surplus is expressed by pressing regular surface of the lens to the covering layer having the same regular shape. Moreover, a substantial part of the remaining very thin layer penetrates into the two bonded hydrogel layers, filling up the interstices between the macromolecule chains.

The drying of the ready made lens or of a part of an artificial eye may be carried out in various ways, e.g. by superheated steam, by putting the lens into a warm concentrated sodium chloride or other salt solution etc. As mentioned above, there is also possible to use hard lens made either by turning it from a blank or by polymerization casting of an anhydrous monomer mixture in a rotating mold.

If the soft lens is previously partly dried so that it is but slightly softened or plastified by water, it may be pressed also onto a regular smooth pad and left to dry thereon without using temperatures above 100° C. The drying lasts then, however, substantially longer. The lens may be also plastified with glycerol or ethylene glycol instead with water. The drying out may take place also under a thin polyethylene or similar foil through which the water vapors may penetrate. The foil serves for maintaining lenses pressed onto the pad.

The drawing or painting on the dry hydrogel is very convenient, the lines remaining sharp and unblurred. Onto the planar covering layer even three-color prints may be easily applied, which technique is very difficult to use with concave layers in the mold.

The covering layer may contain, if desired, also a transparent filler consisting of insoluble small particles of the same or similar hydrogel.

Both corneal and scleral colored lenses may be manufactured by the method according to the invention.

The curvature of the final lens may be adjusted, if desired, also by adding some physiologically innocuous solvent such as glycerol diacetate to the monomer cement. Hydrogel from ethyleneglycol methacrylate containing less than about 40% of the said solvent swells in water or in physiologic solution. At about 40% of the solvent, the subsequent swelling in water is nearly zero. At higher contents than 40%, the hydrogel shrinks in water, proportionally with the percentage of the solvent replaced thereby.

Usually, an opaque colored layer of the simulated iris is first brought onto the covering layer, then the fine design of radial lines of the iris and, in the case of scleral lens or prosthesis, covered first by white pigment, fine veins may be drawn by means of a needle and the grooves thus obtained filled up with red pigment. The corners may be slightly tinted yellow. In the case of artificial eyes the covering layer may be pigmented directly so that the pupil is simulated by a black circle. In the case of a contact lens, the covering layer may be also pigmented except the central circle which must be left clear.

As a binding agent for pigments used, a viscous solution of the above mentioned non-crosslinked glycol methacrylate or acrylate polymer is very suitable. Also the covering layer itself can be made pigmented so that individual parts of the pattern are created immediately using dyed or pigmented solutions of said non-crosslinked hydrophilic polymer. As solvent, e.g. aqueous 50% ethanol may be used. So the pupil is painted black or covered with clear polymer solution, the iris blue or brown and the sclera white. As said above, the polymer gets insoluble when cemented to the lens. In this way, all parts of the lens or artificial eye are firmly bonded together.

It is also possible to apply the colored pattern onto the planarized concave side of the lens or prosthesis prior to bonding it to the covering layer. This embodiment may be used advantageously if the pattern is printed. Then the covering layer may be formed immediately on the pattern.

Hydrogels according to the invention are physiologically inert, sparingly cross-linked and thus insoluble, but soft, pliable transparent polymers swellable in water or in physiologic solution. They may be prepared by polymerizing hydrophilic mono-olefinically unsaturated monomers such as ethyleneglycol monomethacrylate or acrylate, diethyleneglycol monomethacrylate, acrylamide, methacrylamide or similar, or mixtures thereof, with less than about 2% of a cross-linking agent soluble in the monomer mixture and containing two or more polymerizable double bonds, such as glycol dimethacrylates, N,N'-methylene-bis-methacrylamide, divinylsulfone etc.

DESCRIPTION OF PREFERRED EMBODIMENTS

The following examples are further illustrative of the present invention, and it will be understood that the invention is not limited thereto:

Example 1

A scleral contact lens of following parameters was used. Front surface: Spherical, diameter 10.2 mm., radius of the curvature 6.4 mm. The peripheral scleral part is also spherical with the curvature radius 9.0 mm., reaching up to the border of the lens having the diameter 16.4 mm. The concave back surface is parabolic, with central curvature radius 6.2 mm. Central thickness is 1.75 mm., sagittal depth 4.25 mm.

The lens was dried at 110° C. and planarized by pressing it onto a polished glass plate heated to 140° C. After cooling down the planar shape is fixed and the pattern may be applied. The veins of the sclera and the fine design of the iris are made by means of "dry meedle method" wherein the layer is engraved to form grooves in which a dry pigment is placed. The design is drawn with a needle and the grooves filled up with a powdered dry pigment. The excess of the pigment is wiped away from the surface, which is then covered by white pigment on the scleral part and blue or brown pigment in the simulated iris. Regarding the fact that the dry lens will swell to a linear enlargement of about 17%, the pattern must be reduced accordingly. A drop i.e. about 0.2 ml. of ethyleneglycol monomethacrylate containing 0.2% ethyleneglycol dimethacrylate and 0.3% di-isopropyl percarbonate (all percentages by weight) is put onto a clean microscopical covering glass. The planarized lens is laid onto the drop of the initiated monomer mixture, which is distributed quite evenly, due to capillary forces, between the glass and the lens, forming a layer about 0.1 mm. thick. The whole is then laid onto a horizontal plate heated to 60° C. and provided with a cover for inert oxygen-free gas (carbon dioxide or pure nitrogen, argon, etc.). In 10 minutes the polymerization is finished and the lens with the covering layer is left to swell in water. At 60° C. the lens is loosened from the glass after 8 hours, and in further 3 hours the swelling is finished. The colored contact lens thus obtained differs only slightly from the original lens in thickness and curvature. The original lens was, however, exceedingly curved so that the change of the curvature is advantageous. The lens may be used for any blind eye with the bulb preserved without substantial deformation.

For albinos, the sclera and iris are pigmented to opacity and the pupilar center left clear. Also the covering layer may be pigmented black.

Example 2

Hydrogel contact lens according to Example 1 was deprived of most of water by immersing it into a hot, saturated kitchen salt solution. The salt on the surface of the lens was wiped off. The lens was shrunk but still flexible and tough. It was pressed onto a mildly heated glass spherical surface of approximately equal curvature and held in its position by a thin elastic rubber foil stretched thereover. After having been dried the now hard lens was removed. On the same or on a little smaller spherical surface a thin layer of cross-linked ethylenglycol methacrylate polymer was formed by applying a viscous solution of the soluble polymer according to the above mentioned French patent in ethyleneglycol monomethacrylate, containing 0.4% of the respective diester. To said solution 0.5% of di-isopropyl percarbonate was admixed and the whole is placed in oxygen-free gas. The polymerization takes place rapidly at 60° C. The soluble polymer contained prevailing ethyleneglycol monomethacrylate units with about 1.4% of ethyleneglycol dimethacrylate units.

Onto the covering layer thus formed a colored pattern simulating the iris was applied, using insoluble pigments dispersed in a viscous solution of the same soluble glycol methacrylate polymer. Then the dried lens, previously molded, was bound with the covering layer with the pattern by putting one drop of initiated monomer mixture (ethylene glycol monomethacrylate containing 0.4% of the diester and 0.5% of di-isopropyl percarbonate) into the concave side of the lens and applying the lens onto the covering layer on the spherical surface. The lens was fixed by stretching a thin rubber foil thereover. After finished polymerization of the monomer cement the lens together with the spherical molding patrix was immersed in water until the swollen colored lens separated.

Example 3

A corneal contact lens, diameter 8.2 mm., central thickness 0.36 mm., radius of curvature 6.8 mm., prepared by polymerization-casting in a rotating mold from a monomer mixture, consisting of 79.0 p. of ethyleneglycol monomethacrylate, 0.4 p. of ethylenglycol dimethacrylate, 19.2 p. of water, 0.6 p. of ammonium persulfate and 0.8 p. of dimethylaminoethyl acetate, was partly dried on the air at room temperature and then, still flexible, was planarized by pressing it onto a smooth glass surface heated to 125° C. In several minutes the lens was dry and could be easily removed.

Meanwhile a thin hydrogel layer was created on another glass plate using the monomer-polymer mixture according to Example 2. A color picture of human iris on a thin gelatine film, carefully separated from the plastic supporting cellulose triacetate film, was laid onto the covering hydrogel layer. The central circle corresponding to the pupil was cut out. The dry planarized lens was cemented with the picture and covering layer by means of a drop of monomer mixture described in Example 2. After finished polymerization of the monomer cement the whole was put in water, the overlapping covering layer, which swelled in several minutes, was cut off and the lens was left to swell, until it could be easily separated from the glass pad. It was then put into sterile physiologic solution.

In the above examples, all parts are by weight.

The procedure described in the examples may be changed in various directions. When the size of the molding patrix is properly chosen, it is not necessary to press the lens onto the covering layer during the polymerization of the cement. Similarly when using planarized lens, its weight is sufficient to ensure the bond.

In any way, the color pattern is separated both from the eye and the eye-lid by a layer of hygienically innocuous hydrogel. If the pigments and dyestuffs are insoluble in water and tears, any irritation or staining of the eye is avoided. Moreover, the colored pattern of the iris is lodged under a transparent layer of approximately equal thickness with the natural cornea, so that it has the same brilliance as normal human eye.

The drying of the lens or similar prior to the deformation can be also carried out by immersing the hydrogel article into a hot liquid miscible with water, preferably into glycerol or ethylene glycol.

I claim:

1. The process of manufacturing patterned ophthalmic prostheses comprising the steps forming a shaped first transparent hydrogel layer, applying to one surface of said layer a water insoluble colored pattern; applying to said patterned surface a second hydrogel layer, interposing between said first hydrogel layer and said second hydrogel layer an initiated monomer mixture capable of forming a compatible hydrogel with both said layers, and polymerizing said monomeric mixture to bond said hydrogel layers together.

2. The method according to claim 1 wherein at least one of said layers is a substantially finished at least partially dried and regularly shaped ophthalmic prosthesis.

3. The method according to claim 1 wherein one of said layers is formed from said initiated mixture of the monomer.

4. Method as set forth in claim 1, wherein the second hydrogel layer is prepared by polymerizing a hydrophilic monomer mixture, containing less than 2% of a cross-linking agent.

5. Method as set forth in claim 1, wherein the monomer mixture is thickened with a non-crosslinked polymer of the same kind.

6. Method as set forth in claim 1, wherein the second layer is formed by applying a solution of a non-crosslinked hydrophilic polymer of the same kind as the main polymer, which covering layer is made insoluble by cementing it with the hydrogel article by means of the said initiated monomer mixture.

7. Method according to claim 2 wherein the patterning is carried out by pressing the at least partly dried article with its back side onto a smooth planar pad, heated above the glass transition temperature of the hydrophilic polymer, cooling the article and pad under said temperature and removing the article from the pad.

8. Method according to claim 2, wherein the partial drying of the article is carried out by immersing it into a hot liquid capable of easily absorbing water.

9. Method according to claim 1 wherein the pattern is formed by needling said layer to engrave the same and applying colored powder to said engraved portions.

10. Method as set forth in claim 1 wherein the colored pattern is applied with inks consisting of insoluble pigments and a solution of a non-crosslinked hydrophilic polymer of the same kind as the main hydrogel.

11. Method as set forth in claim 7 wherein the article is adhered during the patterning to the pad by means of porous elastic foil through which water vapors penetrate.

References Cited
UNITED STATES PATENTS 2,830,002   4/1958   Mohs _____ 156—212 X
3,232,800   2/1966   Butcher et al. _____ 156—212

BENJAMIN R. PADGETT, Primary Examiner

S. J. LECHERT, Jr, Assistant Examiner

U.S. Cl. X.R.

156—63, 83, 86, 277, 327; 3—13; 351—162